United States Patent
Miyazawa (10) Patent No.: US 9,248,575 B2
(45) Date of Patent: Feb. 2, 2016

(54) ROBOT HAND AND ROBOT

(71) Applicant: Seiko Epson Corporation, Tokyo (JP)

(72) Inventor: Osamu Miyazawa, Shimosuwa-machi (JP)

(73) Assignee: Seiko Epson Corporation (JP)

( * ) Notice: Subject to any disclaimer, the term of this patent is extended or adjusted under 35 U.S.C. 154(b) by 49 days.

(21) Appl. No.: 14/199,355

(22) Filed: Mar. 6, 2014

(65) Prior Publication Data

US 2014/0284951 A1    Sep. 25, 2014

(30) Foreign Application Priority Data

Mar. 25, 2013   (JP) ................. 2013-061545

(51) Int. Cl.
| | |
|---|---|
| B66C 1/00 | (2006.01) |
| B66C 1/42 | (2006.01) |
| B25J 15/00 | (2006.01) |
| H02N 2/00 | (2006.01) |
| H02N 2/10 | (2006.01) |

(52) U.S. Cl.
CPC ............. B25J 15/0009 (2013.01); H02N 2/004 (2013.01); H02N 2/103 (2013.01)

(58) Field of Classification Search
CPC .. B25J 15/0009; B66C 1/46; H01L 21/68707; A61F 2/583; H02N 2/004; H02N 2/103
USPC ....................................................... 294/106
See application file for complete search history.

(56) References Cited

U.S. PATENT DOCUMENTS

| | | | |
|---|---|---|---|
| 6,723,106 B1 | 4/2004 | Charles et al. | |
| 7,168,748 B2 * | 1/2007 | Townsend et al. | 294/106 |
| 7,296,835 B2 * | 11/2007 | Blackwell et al. | 294/111 |
| 7,654,595 B2 * | 2/2010 | Yokoyama et al. | 294/99.1 |
| 2004/0212278 A1 | 10/2004 | Miyazawa | |
| 2005/0040664 A1 * | 2/2005 | Kameda et al. | 294/106 |
| 2009/0015026 A1 * | 1/2009 | Matsuda et al. | 294/106 |
| 2010/0176615 A1 * | 7/2010 | Okuda et al. | 294/106 |
| 2012/0279342 A1 | 11/2012 | Yasukawa et al. | |

FOREIGN PATENT DOCUMENTS

| | | |
|---|---|---|
| JP | 2004-009281 A | 1/2004 |
| JP | 2004-260990 A | 9/2004 |
| JP | 2005-102397 A | 4/2005 |
| JP | 2006-234009 A | 9/2006 |
| JP | 2010-148253 A | 7/2010 |
| JP | 2010-221043 A | 10/2010 |
| JP | 2012-235622 A | 11/2012 |

\* cited by examiner

*Primary Examiner* — Stephen Vu (74) *Attorney, Agent, or Firm* — Harness, Dickey & Pierce, P.L.C.

(57) ABSTRACT

A second member having an elongated shape is attached to a first member via a connecting member. The connecting member is rotatable around a first shaft in a direction intersecting with a longitudinal direction of the second member with respect to the first member and rotatable around a second shaft intersecting both the longitudinal direction and a direction along the first shaft with respect to the second member. Further, a first drive part that rotationally drives the connecting member around the first shaft is provided in the first member and a second drive part that rotationally drives the connecting member around the second shaft is provided in the second member. In this manner, a robot hand that can rotate the first member and the second member not only around the first shaft but also around the second shaft may be realized with a simpler and smaller structure.

11 Claims, 11 Drawing Sheets

ROBOT HAND AND ROBOT

BACKGROUND

1. Technical Field

The present invention relates to a robot hand and a robot.

2. Related Art

A robot hand that can grasp an object using fingers has been known. The robot hand grasps the object by bending the fingers in joint parts. Note that "bending direction" here refers to a direction in which a finger is bent when a human grasps the object. In order to enable grasping of various objects in the robot hand, it is desired that the joints are adapted to move the fingers not only in the bending directions in the joint parts but also in the directions different from the bending directions.

Accordingly, a technology of forming a joint by combining a second joint shaft for moving the finger in the bending direction and a first joint shaft for rotating the finger together with the second joint shaft in the direction different from the bending direction has been proposed (Patent Document 1 (JP-A-2004-009281).

However, in the proposed technology, a main joint part is externally fitted on the first joint shaft fixed to the device main body side and a second joint movable part having an arc shape is rotatably and axially supported on the outer circumference of the main joint part. Further, the main joint part is swiveled around the first joint shaft using a first motor, and the second joint movable part is rotated using a linear step motor. Accordingly, there has been a problem that the structure of the joint parts becomes complex and the robot hand becomes larger.

SUMMARY

An advantage of some aspects of the invention is to provide a technology of realizing a robot hand that can move fingers in directions in joint parts with a simpler and smaller structure.

A robot hand according to an aspect of the invention includes a first member, a second member having an elongated shape, a connecting member attached to the first member so as to rotate around a first shaft intersecting a longitudinal direction of the second member and attached to the second member so as to rotate around a second shaft intersecting the longitudinal direction and a direction along the first shaft, a first drive part provided in the first member and rotationally driving the connecting member around the first shaft, and a second drive part provided in the second member and rotationally driving the connecting member around the second shaft.

In the robot hand according to the aspect of the invention, the second member having the shape along the longitudinal direction is attached to the first member via the connecting member. Further, the connecting member is attached to the first member rotatably around the first shaft intersecting the longitudinal direction of the second member, and the connecting member may be rotationally driven around the first shaft using the first drive part provided in the first member. Furthermore, the connecting member is attached to the second member rotatably around the second shaft intersecting both the longitudinal direction and the direction along the first shaft, and the connecting member may be rotationally driven around the second shaft using the second drive part provided in the second member. Accordingly, a robot hand that can rotate the first member and the second member not only around the first shaft but also around the second shaft may be realized with a simpler and smaller structure.

The robot hand according to the aspect of the invention may be configured such that the longitudinal direction of the second member, the first shaft, and the second shaft are orthogonal to one another.

According to the configuration, the direction of movement of the second member when rotated around the first shaft and the direction of movement of the second member when rotated around the second shaft are independent of each other, and the direction of movement with rotation around the first shaft contains no component in the direction of movement with rotation around the second shaft. Accordingly, control of the first drive part that rotates the connecting member around the first shaft and the second drive part that rotates the connecting member around the second shaft may be made simpler.

The robot hand according to the aspect of the invention may be configured such that one of the first shaft and the second shaft is provided in a position offset from the centroid of a section set by a plane orthogonal to the longitudinal direction in the second member.

When the first shaft and the second shaft are not offset with respect to the centroid of the section set by the plane orthogonal to the longitudinal direction in the second member, the section of the second member has a shape without deflection with respect to either of the first shaft or the second shaft. Accordingly, the movable ranges of the second member are nearly the same with respect to any shaft regardless of the rotation directions. On the other hand, if one of the first shaft and the second shaft is offset from the centroid of the section of the second member, a section shape deflected toward one of the offset shaft is obtained. Accordingly, with respect to the offset shaft, the movable range of the second member in the offset direction may be widened.

The robot hand according to the aspect of the invention may be configured such that the first member is a member having an elongated shape.

According to the configuration, a robot hand that can also bend finger parts of the robot hand in joints for bending the fingers in other directions than the bending direction may be realized.

The robot hand according to the aspect of the invention may be configured such that the first drive part and the second drive part are vibrators containing a piezoelectric material.

According to the configuration, the first drive part and the second drive part may be formed to be smaller, and the robot hand may be downsized. Further, in the case where a method of driving by vibrating the vibrators is employed, the connecting member is not rotated around the first shaft while the first drive part is not vibrated and the connecting member is not rotated around the second shaft while the second drive part is not vibrated. Accordingly, power for maintaining the same attitude becomes unnecessary and power saving may be realized.

The robot hand according to the aspect of the invention may be configured such that the robot hand includes a first reduction mechanism that decelerates rotation from the first drive part.

According to the configuration, the drive force generated by the first drive part may be increased and transmitted to the connecting member. Further, the movement of the first drive part is decelerated and transmitted to the connecting member, and thereby, the fine movement of the connecting member may be controlled.

The robot hand according to the aspect of the invention may be configured such that the robot hand includes a second reduction mechanism that decelerates rotation from the second drive part.

According to the configuration, the drive force generated by the second drive part may be increased and transmitted to the connecting member. Further, the movement of the second drive part is decelerated and transmitted to the connecting member, and thereby, the fine movement of the connecting member may be controlled.

The robot hand according to the aspect of the invention may be grasped as the following configuration. That is, the aspect of the invention may be grasped as a robot hand including a first member, a second member having an elongated shape, a connecting member that connects the first member and the second member, a first shaft that connects the first member and the connecting member and intersects a longitudinal direction of the second member, a second shaft that connects the second member and the connecting member and intersects both the longitudinal direction and the first shaft, a first drive part provided in the first member and rotationally driving the connecting member around the first shaft, and a second drive part provided in the second member and rotationally driving the connecting member around the second shaft.

Alternatively, the robot hand of the aspect of the invention may be grasped as a robot hand including a first member, a second member having an elongated shape, a connecting member that connects the first member and the second member, a first vibrator provided in the first member and vibrates in a bending direction and a stretching direction, a first shaft that connects the first member and the connecting member and intersects the stretching direction of the first vibrator, a second shaft that connects the second member and the connecting member and intersects both the longitudinal direction and the stretching direction of the first vibrator, and a second vibrator provided in the second member and vibrating in a bending direction and a stretching direction, the bending direction and the stretching direction intersecting the second shaft, wherein the first vibrator rotationally drives the connecting member around the first shaft, and the second vibrator rotationally drives the connecting member around the second shaft.

The robot hands grasped by the aspects described above may rotate the first member and the second member not only around the first shaft but also around the second shaft. Nevertheless, robot hands having simpler and smaller structures may be realized.

Further, the robot hands described above can be formed to be smaller while they can rotate the first member and the second member around the first shaft and the second shaft. Accordingly, the robot hand according to the aspects of the invention can be mounted on robots, and thereby, high-performance robots can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
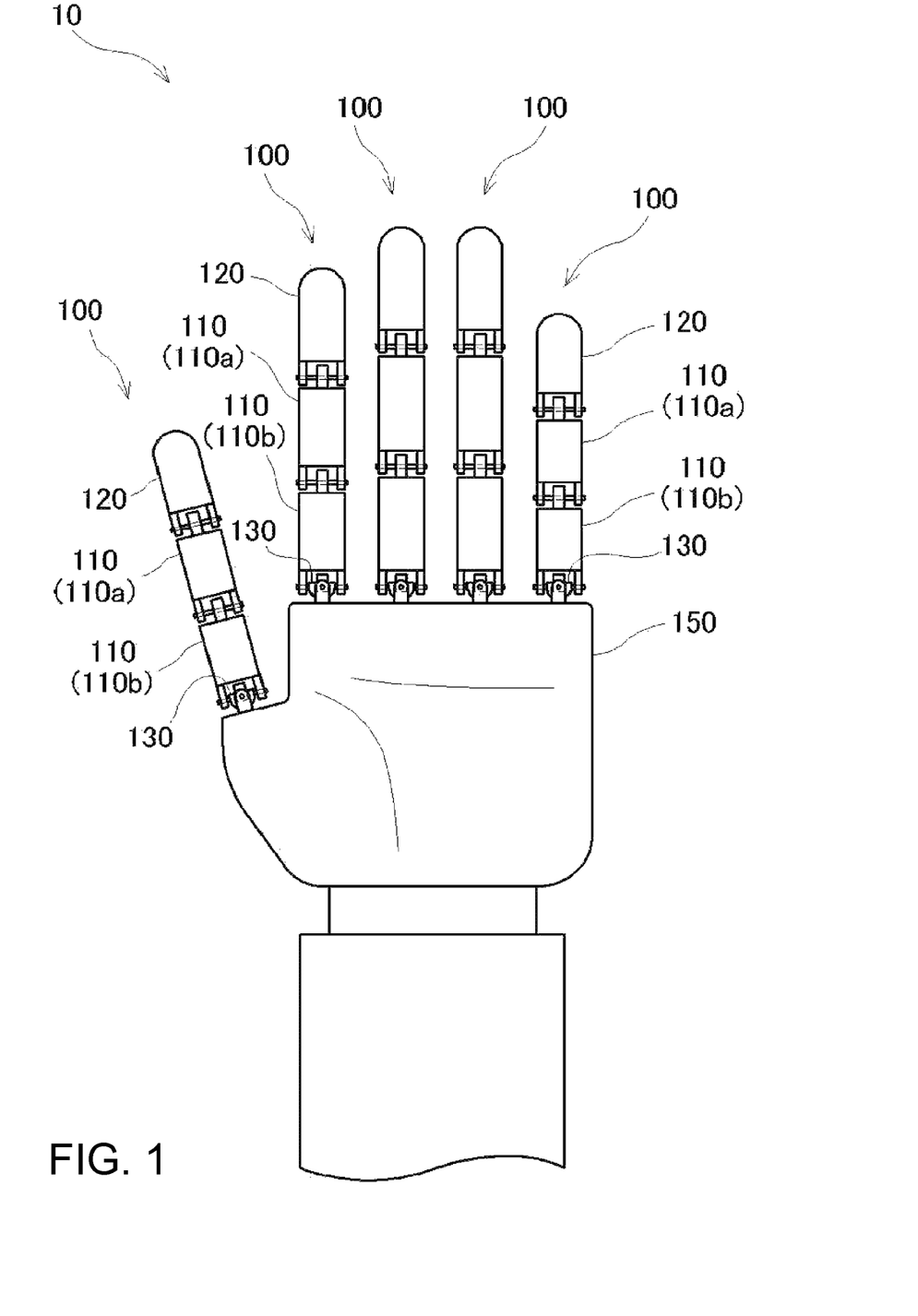
FIG. 1 is an explanatory diagram showing an appearance shape of a robot hand of an embodiment.

FIG. 1 is an explanatory diagram showing an appearance shape of a robot hand 10 of an embodiment. As illustrated, the robot hand 10 of the embodiment has a structure in which five finger parts 100 are provided on a palm part 150. Further, each finger part 100 has a finger tip member 120 having a nearly cylindrical shape, intermediate members 110 having nearly cylindrical shapes, and a connecting member 130 that connects the intermediate member 110 to the palm part 150. Though the details will be described later, one end of the finger tip member 120 is rotatably and axially supported in a bending direction with respect to one end of the intermediate member 110, and a joint structure is formed between the finger tip member 120 and the intermediate member 110. Further, the other end of the intermediate member 110 is rotatably and axially supported in a bending direction with respect to one end of the other intermediate member 110, and a joint structure is also formed between the intermediate member 110 and the intermediate member 110. Furthermore, the intermediate member 110 and the palm part 150 are connected via the connecting member 130, and thereby, a joint structure rotatable in two directions is formed.

Note that, when it is necessary to distinguish the two intermediate members 110 provided in the finger part 110, the intermediate member 110 forming the joint structure between the finger tip member 120 and itself may be referred to as "end-side intermediate member 110a" and the intermediate member 110 forming the joint structure between the end-side intermediate member 110a and itself may be referred to as "base-side intermediate member 110b". Further, a direction in which the four finger parts 110 are arranged (the horizontal direction on the paper surface of FIG. 1) may be referred to as "side surface direction" and the side shown in FIG. 1 may be referred to as "pad side" and the side not shown in FIG. 1 may be referred to as "back side". Furthermore, a direction connecting "pad side" and "back side" (the direction at right angle to the paper surface of FIG. 1) may be referred to as "front-back direction". Note that, in the embodiment, the palm part 150 corresponds to "first member" in the invention and the base-side intermediate member 110b corresponds to "second member" in the invention.

Figure 2A:
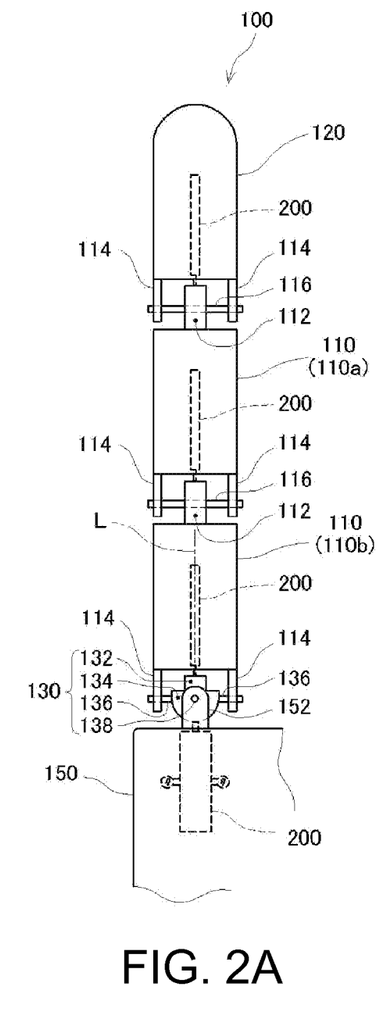
FIGS. 2A and 2B are explanatory diagrams showing a structure of a finger part of the robot hand of the embodiment.
Figure 2B:
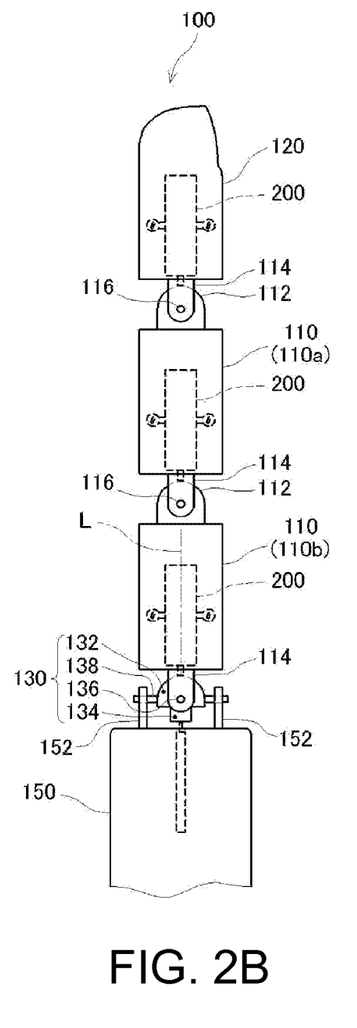

FIGS. 2A and 2B are explanatory diagrams showing a structure of the finger part 100 mounted on the robot hand 10 of the embodiment. Note that, in FIGS. 2A and 2B, the index finger is used for explanation, however, the same applies to the other four fingers. FIG. 2A shows a state when the finger part 100 is seen from the pad side and FIG. 2B shows a state when the finger part 100 is seen from the side surface direction.

First, the joint structure formed between the finger tip member 120 and the end-side intermediate member 110a will be explained. As illustrated, a driven portion 112 having a semi-circular disc shape is projected toward the finger tip member 120 nearly at the center of the end surface of the end-side intermediate member 110a, and a joint shaft 116 is inserted through the center position of the disc shape of the driven portion 112. Further, axial support portions 114 are projected from the finger tip member 120 toward both sides of the driven portion 112, and both ends of the joint shaft 116 inserted through the driven portion 112 are axially supported by the axial support portions 114. Accordingly, the finger tip member 120 and the end-side intermediate member 110a are connected rotatably around the joint shaft 116 (in the bending direction). Furthermore, a piezoelectric motor 200, which will be described later, is housed inside of the finger tip member 120. As will be described later, a convex portion 212 (see FIG. 3) is provided on the piezoelectric motor 200 and the convex portion 212 is pressed against the driven portion 112.

The joint structure formed between the end-side intermediate member 110a and the base-side intermediate member 110b is the same as the above described joint structure. That is, the driven portion 112 is projected on the end surface of the base-side intermediate member 110b, and the joint shaft 116 is inserted through the driven portion 112. Further, the axial support portions 114 are projected from the end-side intermediate member 110a, and both ends of the joint shaft 116 inserted through the driven portion 112 are axially supported by the axial support portions 114. Accordingly, the end-side intermediate member 110a and the base-side intermediate member 110b are connected rotatably around the joint shaft 116 (in the bending direction). Furthermore, the piezoelectric motor 200 is housed inside of the end-side intermediate member 110a, and the convex portion 212 (see FIG. 3) of the piezoelectric motor 200 is pressed against the driven portion 112.

The connecting member 130 is formed in a shape of a combination of a first driven portion 132 formed in a semi-circular disc shape and a second driven portion 134 formed in a semi-circular disc shape. Further, the first driven portion 132 and the second driven portion 134 have a positional relationship such that the first driven portion 132 and the second driven portion 134 may be turned to 90 degrees with the arc-shaped portions directed in the opposite directions (i.e., the portions at the diameter sides of the semi-circles may be located back to back).

Second shafts 136 are projected at both sides along the diameter of the second driven portion 134, and the respective second shafts 136 are axially supported by two axial support portions 114 projected from the end surface of the base-side intermediate member 110b. Accordingly, the connecting member 130 and the base-side intermediate member 110b are rotatable around the second shafts 136 (in the bending direction). Similarly, first shafts 138 are also projected at both sides along the diameter of the first driven portion 132, and the respective first shafts 138 are axially supported by two axial support portions 152 projected from the palm part 150. Accordingly, the connecting member 130 and the palm part 150 are rotatable around the first shafts 138. Further, the piezoelectric motors 200 are respectively housed inside of the base-side intermediate member 110b and inside of the palm part 150. Of them, the convex portion 212 (see FIG. 3) of the piezoelectric motor 200 housed in the base-side intermediate member 110b is pressed against the first driven portion 132 and the convex portion 212 of the piezoelectric motor 200 housed in the palm part 150 is pressed against the second driven portion 134.

Note that, in the embodiment, the piezoelectric motor 200 housed in the palm part 150 corresponds to "first drive part", "vibrator", and "first vibrator" in the invention, and the piezoelectric motor 200 housed in the base-side intermediate member 110b corresponds to "second drive part", "vibrator", and "second vibrator" in the invention. Further, the first driven portion 132 and the second driven portion 134 have the positional relationship such that they may be turned to 90 degrees, and the first shafts 138 projected at both sides along the diameter of the first driven portion 132 and the second shafts 136 projected at both sides along the diameter of the second driven portion 134 are orthogonal to each other. Furthermore, the first shafts 138 and the second shafts 136 are also orthogonal to a center axis L of the base-side intermediate member 110b formed in the nearly cylindrical shape.

Figure 3:
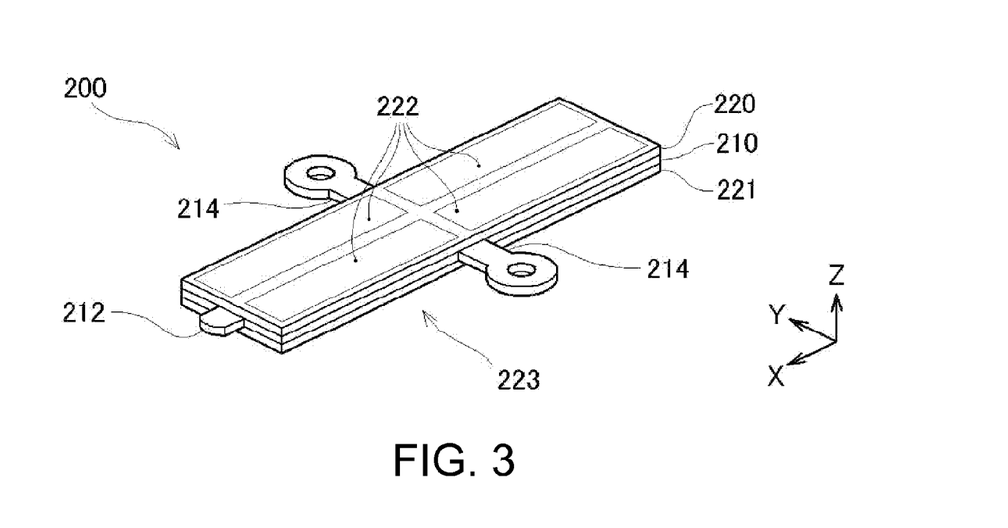
FIG. 3 is a perspective view showing a structure of a piezoelectric motor that drives the finger part.

FIG. 3 is a perspective view showing a structure of the piezoelectric motor 200 housed in the finger tip member 120, the intermediate member 110, or the palm part 150. As illustrated, the piezoelectric motor 200 has a cubic shape with a multilayered structure in which a shim plate 210 formed by a metal flat plate is sandwiched and bonded between two piezoelectric devices (front piezoelectric device 220, rear piezoelectric device 221) formed in plate-like shapes and containing a piezoelectric material. Note that, as below, the longitudinal direction of the piezoelectric motor 200 will be referred to as "X-direction". Further, as shown in the drawing, the lateral direction of the piezoelectric motor 200 orthogonal to the X-direction will be referred to as "Y-direction", and the thickness direction of the piezoelectric motor 200 orthogonal to the X-direction and the Y-direction will be referred to as "Z-direction".

Front electrodes 222 for applying voltages to the front piezoelectric device 220 are provided on the surface (upper surface) opposite to the surface of the front piezoelectric device 220 in contact with the shim plate 210. As shown in FIG. 3, the four rectangular front electrodes 222 are provided to split the upper surface of the front piezoelectric device 220 into four in a lattice shape. Further, though not illustrated, similarly, four rectangular rear electrodes 223 are provided on the surface (lower surface) opposite to the surface of the rear piezoelectric device 221 in contact with the shim plate 210 to split the lower surface into four in a lattice shape. Furthermore, the metal shim plate 210 has a role not only to reinforce the piezoelectric devices (front piezoelectric device 220, rear piezoelectric device 221) but also as a common electrode for applying voltages to the front piezoelectric device 220 and the rear piezoelectric device 221, and is grounded.

The convex portion 212 is provided at the end in the longitudinal direction (X-direction) of the piezoelectric motor 200. Further, a pair of support portions 214 for supporting the piezoelectric motor 200 to be urged toward the side at which the convex portion 212 is provided are provided on both side surfaces facing in the lateral direction (Y-direction) of the piezoelectric motor 200. These convex portion 212 and the support portions 214 are formed integrally with the shim plate 210.

Figure 4A:
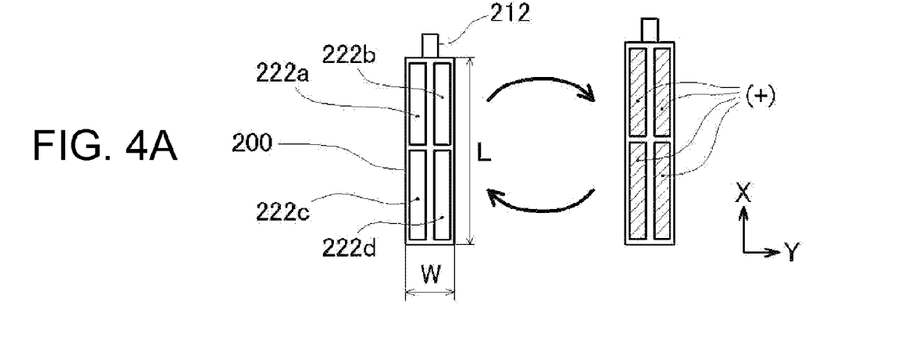
FIGS. 4A to 4C are explanatory diagrams showing an operation principle of the piezoelectric motor.
Figure 4B:
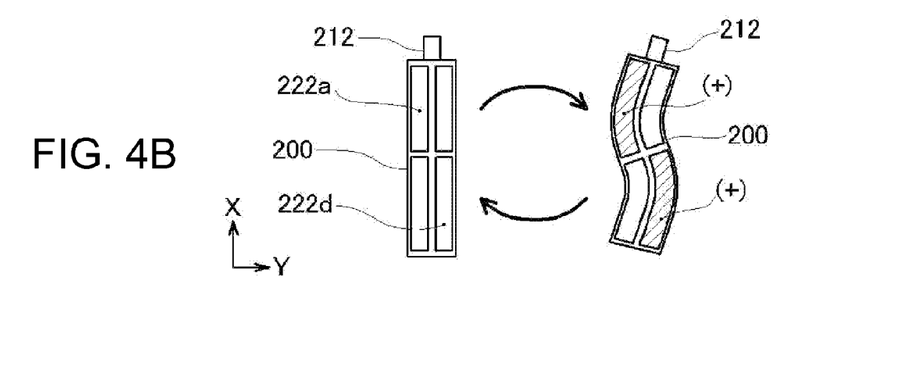
Figure 4C:
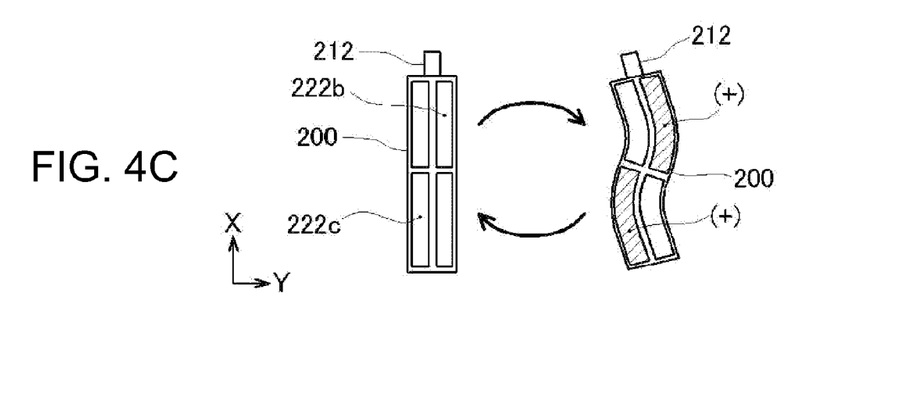

FIGS. 4A to 4C are explanatory diagrams showing an operation principle of the piezoelectric motor 200. The piezoelectric motor 200 operates by elliptic motion of the convex portion 212 of the piezoelectric motor 200 when voltages are applied to the front electrodes 222 and the rear electrodes 223 of the piezoelectric motor 200 with a constant period. The convex portion 212 of the piezoelectric motor 200 makes elliptic motion for the following reason. Note that the front electrodes 222 provided on the front piezoelectric device 220 and the rear electrodes 223 provided on the rear piezoelectric device 221 are plane-symmetric with respect to the X-Y plane and basically the same and, here, the explanation will be made by taking the front electrodes 222 as examples.

First, as is well known, the piezoelectric devices containing the piezoelectric material (front piezoelectric device 220, rear piezoelectric device 221) have properties of expanding when positive voltages are applied. Therefore, as shown in FIG. 4A, when application of positive voltages to all of the four front electrodes 222 and non-application of the applied voltages are repeated, the piezoelectric motor 200 (front electrodes 222) repeats movement of expanding and contracting in the longitudinal direction (X-direction). The movement of the piezoelectric motor 200 repeating expanding and contracting in the longitudinal direction (X-direction) is called "longitudinal vibration". As below, the directions in which the piezoelectric motor 200 expands and contracts (±X-directions in the drawing) are called "stretching directions". Further, as the frequency at which the positive voltages are applied is changed, the amount of stretch rapidly increases at a specific frequency, and a kind of resonance phenomenon occurs. A frequency at which resonance occurs in the longitudinal vibration (resonance frequency) is determined by the properties of the front piezoelectric device 220 and the dimensions (width W, length L, thickness T) of the front piezoelectric device 220.

Further, as shown in FIG. 4B or 4C, a set of the two front electrodes 222 diagonally located to each other (a set of the front electrode 222a and the front electrode 222d or a set of the front electrode 222b and the front electrode 222c) is considered and positive voltages are applied thereto with a constant period. Then, the end of the piezoelectric motor 200 (front piezoelectric device 220) in the longitudinal direction (X-direction) (the part provided with the convex portion 212) repeats movement like oscillation in the lateral direction (Y-direction) on the drawing. For example, as shown in FIG. 4B, when the positive voltages are applied to the set of the front electrode 222a and the front electrode 222d with the constant period, the end of the piezoelectric motor 200 in the longitudinal direction repeats movement of moving to the right. Furthermore, as shown in FIG. 4C, when the positive voltages are applied to the set of the front electrode 222b and the front electrode 222c with the constant period, the end of the piezoelectric motor 200 in the longitudinal direction repeats movement of moving to the left. The movement of the piezoelectric motor 200 is called "bending vibration". As below, the directions in which the piezoelectric motor 200 bends and vibrates (±Y-directions in the drawing) are called "bending directions". Regarding the bending vibration, there is a resonance frequency determined by the properties of the front piezoelectric device 220 and the dimensions (width W, length L, thickness T) of the front piezoelectric device 220. Therefore, when the positive voltages are applied at the resonance frequency to the two front electrodes 222 diagonally located to each other, the piezoelectric motor 200 vibrates with large oscillation to the right or the left (Y-direction).

Here, both the resonance frequency of the longitudinal vibration shown in FIG. 4A and the resonance frequency of the bending vibration shown in FIG. 4B or 4C are determined by the properties of the front piezoelectric device 220 and the dimensions (width W, length L, thickness T) of the front piezoelectric device 220. Therefore, by appropriate selection of the dimensions (width W, length L, thickness T) of the front piezoelectric device 220, the two resonance frequencies may be made equal. Further, the voltage in the form of the bending vibration as shown in FIG. 4B or 4C is applied to the front piezoelectric device 220 at the resonance frequency, the bending vibration as shown in FIG. 4B or 4C occurs and the longitudinal vibration in FIG. 4A is induced by the resonance. As a result, when the voltages are applied to the set of the front electrode 222a and the front electrode 222d in the form shown in FIG. 4B, the end of the piezoelectric motor 200 (the part provided with the convex portion 212) makes movement of describing an ellipse (elliptic motion) clockwise on the drawing. Further, when the voltages are applied to the set of the front electrode 222b and the front electrode 222c in the form shown in FIG. 4C, the end of the piezoelectric motor 200 makes elliptic motion counterclockwise on the drawing. Note that the explanation has been made with application of the positive voltages to the front electrodes 222. However, as is well known, the piezoelectric material is also deformed by application of a negative voltage. Therefore, the negative voltages may be applied to the front electrodes for generation of bending vibration (longitudinal vibration) or alternating voltages of repeating positive voltages and negative voltages may be applied to the front electrodes 222 for generation of bending vibration (longitudinal vibration). Further, in the above description, the explanation has been made with application of the voltages at the resonance frequency. However, for example, pulsed voltages may be employed as long as voltages having waveforms containing resonance frequencies are applied. Furthermore, regarding the rear piezoelectric device 221, like the front piezoelectric device 220, bending vibration and longitudinal vibration may be generated by application of voltages to the rear electrodes 223.

The piezoelectric motor 200 drives the driven member using the elliptical motion. That is, the elliptical motion is generated with the convex portion 212 of the piezoelectric motor 200 pressed against the driven member. Then, the convex portion 212 repeats the movement of moving from left to right (or from right to left) while being pressed against the driven member when the piezoelectric motor 200 expands, and returning to the original position while being apart from the driven member when the piezoelectric motor 200 contracts. As a result, the driven member is driven in one direction by the frictional force from the convex portion 212.

Figure 5:
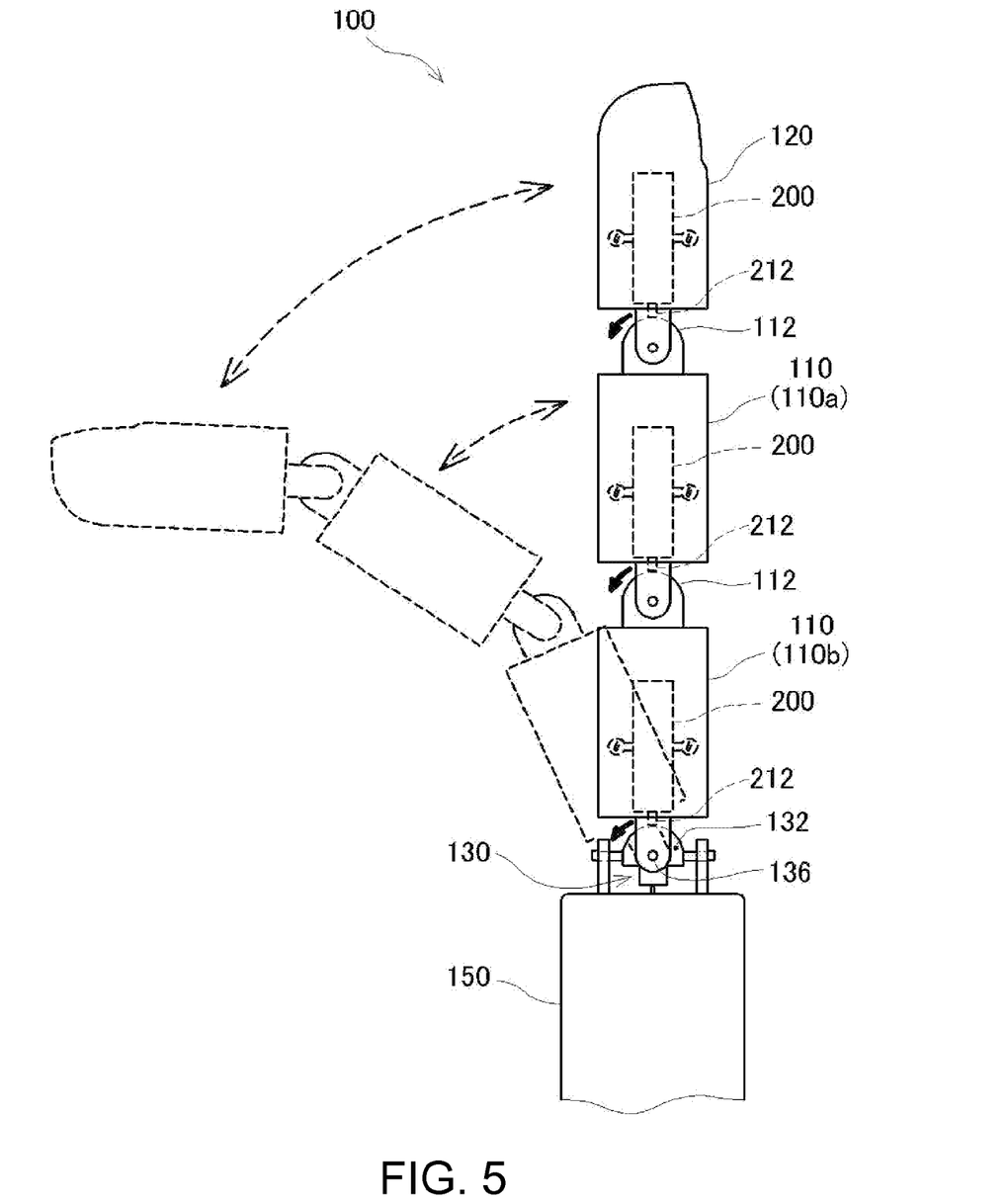
FIG. 5 is an explanatory diagram showing movement of bending and spreading the finger part by the robot hand of the embodiment.

FIG. 5 is an explanatory diagram showing movement of bending and spreading the finger part 100 when the finger part 100 is seen from the side surface direction. For example, since the convex portion 212 is pressed against the driven portion 112, if the piezoelectric motor 200 is driven, the piezoelectric motor 200 housed in the finger tip member 120 may rotate the finger tip member 120 with respect to the driven portion 112 around the joint shaft 116 in the direction shown by a thick arrow. Similarly, the piezoelectric motor 200 is driven, and thereby, the piezoelectric motor 200 housed in the end-side intermediate member 110a may rotate the end-side intermediate member 110a with respect to the driven portion 112 around the joint shaft 116 in the direction shown by a thick arrow. Further, similarly, the piezoelectric motor 200 is driven, and thereby, the piezoelectric motor 200 housed in the base-side intermediate member 110b may rotate the base-side intermediate member 110b with respect to the first driven portion 132 around the second shaft 136 in the direction shown by a thick arrow. As a result, the respective piezoelectric motors 200 are driven, and thereby, as shown by dashed lines in the drawing, the whole finger part 100 may be bent. Or, if the piezoelectric motors 200 are driven in the opposite direction, the bent finger part 100 may be spread.

Note that, in FIG. 5, the explanation that all of the piezoelectric motors 200 housed in the finger tip member 120, the end-side intermediate member 110a, and the base-side intermediate member 110b are driven at the same time in the same direction has been made, however, part of the piezoelectric motors 200 may be driven or part of the piezoelectric motors 200 may be driven in the opposite direction with respect to the other piezoelectric motors 200.

Figure 6:
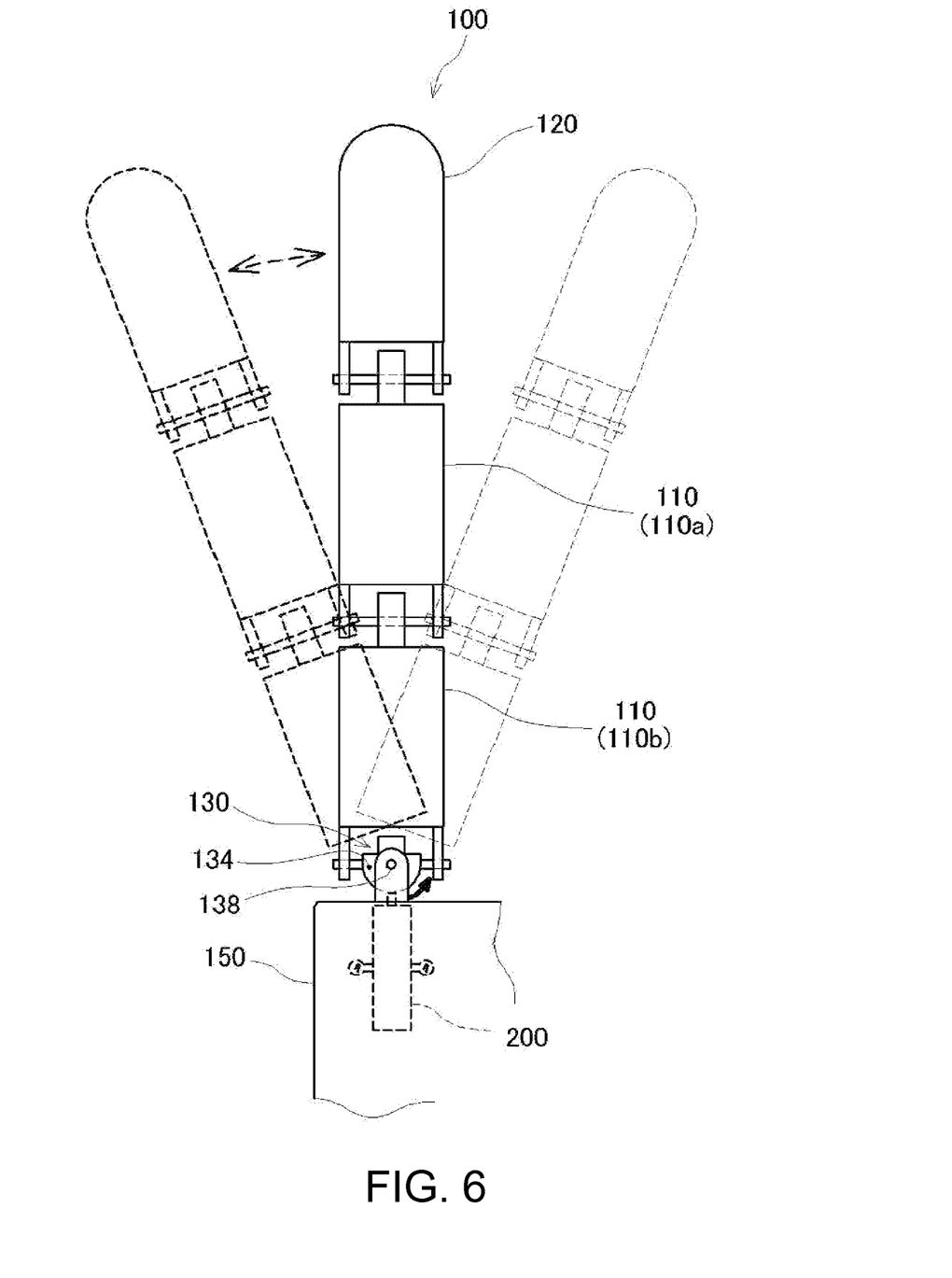
FIG. 6 is an explanatory diagram showing motions of tilting the finger part to right and left by the robot hand of the embodiment.

FIG. 6 is an explanatory diagram showing motions of tilting the finger part 100 to right and left when the finger part 100 is seen from the pad side. When the finger part 100 is tilted to right and left, the second driven portion 134 of the connecting member 130 is rotated around the first shaft 138 in a direction shown by a thick arrow using the piezoelectric motor 200 housed in the palm part 150. In this manner, the whole finger part 100 may be tilted as shown by thick dashed lines in the drawing. Further, if the piezoelectric motor 200 is driven in the opposite direction, the whole finger part 100 may be tilted in the opposite direction as shown by thin dashed lines. Furthermore, if the piezoelectric motor 200 is driven in either direction and the finger part 100 is tilted and then the piezoelectric motor 200 is driven in the opposite direction, the tilted finger part 100 may be returned to the original state. FIG. 6 shows the unbent finger part 100 to be tilted to right and left, however, obviously, the finger part 100 bent as shown in FIG. 5 (or being bent) may be tilted to right and left.

As has been explained above, the robot hand 10 of the embodiment can rotate around the second shaft 136 (bending directions) as shown in FIG. 5 and rotate around the first shaft 138 (lateral directions) as shown in FIG. 6 in the joint part between the finger part 100 (specifically, the base-side intermediate member 110b) and the palm part 150. Accordingly, the respective finger parts 100 may be moved more flexibly to grasp a complex object. Nevertheless, the simple structure in which the finger parts 100 (specifically, the base-side intermediate member 110b) and the palm part 150 are connected via the connecting members 130 and the piezoelectric motors 200 are respectively housed in the finger parts 100 (specifically, the base-side intermediate member 110b) and the palm part 150 may be employed. Accordingly, the joint parts may be downsized and, as a result, upsizing of the robot hand 10 may be avoided.

Note that, in the above described embodiment, the explanation that the second shaft 136 of the connecting member 130 is provided substantially on the center axis L of the base-side intermediate member 110b formed in the nearly cylindrical shape has been made. However, the second shaft 136 may be provided in a position offset with respect to the center axis L of the base-side intermediate member 110b. In this manner, the movable range of the joints may be made wider in the direction in which the second shaft 136 is offset. As below, this point will be explained using the drawings.

Figure 7A:
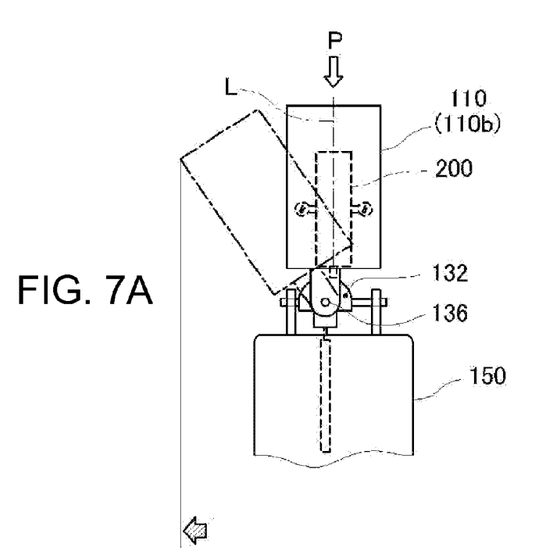
FIGS. 7A to 7D are explanatory diagrams showing a structure of a joint part of a robot hand of a first modified example.
Figure 7B:
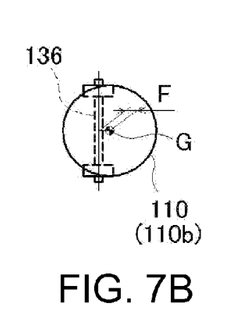

FIGS. 7A to 7D are explanatory diagrams of a first modified example in which the second shaft 136 of the connecting member 130 is offset. FIG. 7A shows a state in which parts of the palm part 150, the connecting member 130, and the base-side intermediate member 110b are seen from the side surface direction, and the end-side intermediate member 110a and the finger tip member 120 are omitted. Further, FIG. 7B shows a state seen from an arrow P in the drawing. The end-side intermediate member 110a and the finger tip member 120 are also omitted in FIG. 7B. As shown in FIG. 7B, the second shaft 136 of the first modified example is offset by a distance F in the direction toward the pad side from the position of the centroid G of the section along a plane orthogonal to the center axis L of the base-side intermediate member 110b. In the state in which the second shaft 136 is offset, the movable limit of the base-side intermediate member 110b in the bending direction is in a position shown by a dashed dotted line in FIG. 7A.

Figure 7C:
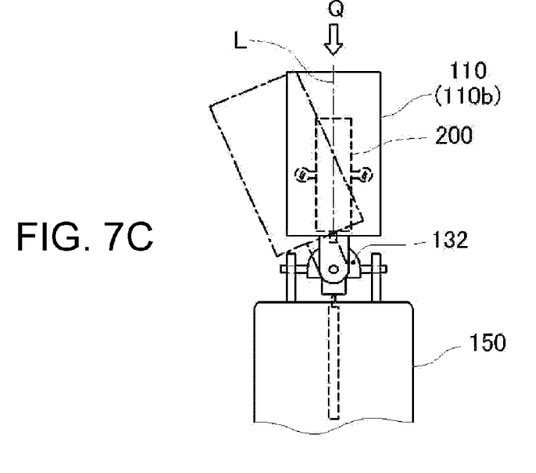
Figure 7D:
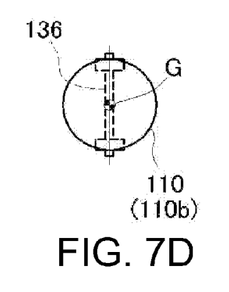

FIG. 7C shows the embodiment in which the second shaft 136 of the connecting member 130 is not offset for reference. Further, FIG. 7D shows a state seen from a direction of an arrow Q in FIG. 7C. As shown in FIG. 7D, the second shaft 136 of the embodiment shown for reference is not offset from the center axis of the base-side intermediate member 110b. Furthermore, in this case, the movable limit of the base-side intermediate member 110b in the bending direction is in a position shown by a dashed dotted line in FIG. 7C. As clearly known from the comparison between the movable limit in FIG. 7A and the movable limit in FIG. 7C, the second shaft 136 is offset, and thereby, the movable limit at the offset side may be made wider.

Furthermore, in the above described embodiment, the explanation that the piezoelectric motor 200 housed in the base-side intermediate member 110b is driven to bend or spread the base-side intermediate member 110b (see FIG. 5), and the piezoelectric motor 200 housed in the palm part 150 is driven to tilt the whole finger part 100 to the right or left (see FIG. 6) has been made. However, as shown in FIGS. 8A and 8B, the piezoelectric motor 200 housed in the palm part 150 may be driven to bend or spread the base-side intermediate member 110b, and the piezoelectric motor 200 housed in the base-side intermediate member 110b may be driven to tilt the whole finger part 100 to the right or left.

Figure 8A:
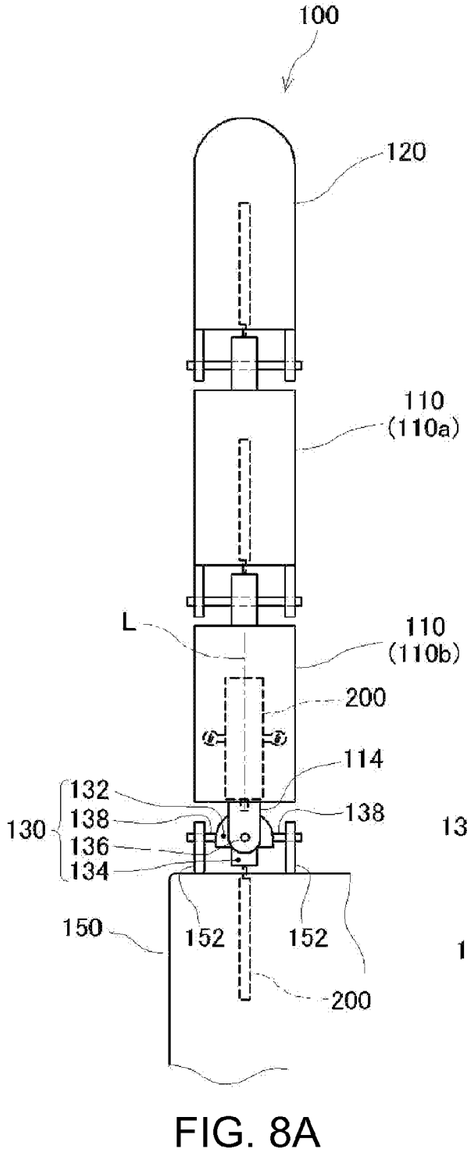
FIGS. 8A and 8B are explanatory diagrams showing a structure of a finger part of a robot hand of a second modified example.
Figure 8B:
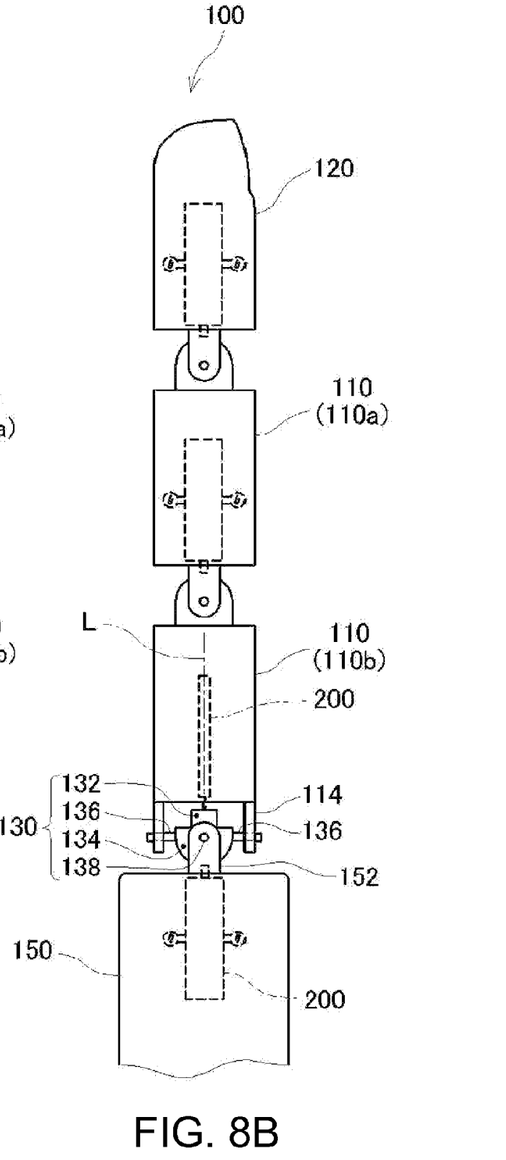

That is, in a second modified example shown in FIGS. 8A and 8B, the first shaft 138 for rotating the connecting member 130 with respect to the palm part 150 is provided in the side surface direction of the finger part 100 (in the lateral directions in FIG. 8A and in the directions at right angle to the paper surface in FIG. 8B). Further, the second shaft 136 for rotating the base-side intermediate member 110b with respect to the connecting member 130 is provided in the front-back directions of the finger part 100 (in the directions at right angle to paper surface in FIG. 8A and in the lateral directions in FIG. 8B). Accordingly, the axial support portions 114, the axial support portions 152, the first driven portion 132, and the second driven portion 134 of the second modified example in FIGS. 8A and 8B are changed into a positional relationship obtained by rotation of the center axis L of the base-side intermediate member 110b to 90 degrees with respect to the embodiment in FIGS. 2A and 2B.

Further, in the above described embodiment and the modified examples, the explanation that the piezoelectric motor 200 directly drives the first driven portion 132 and the second driven portion 134 of the connecting member 130 has been made. However, the piezoelectric motor 200 may drive the first driven portion 132 and the second driven portion 134 via a reduction mechanism.

Figure 9:
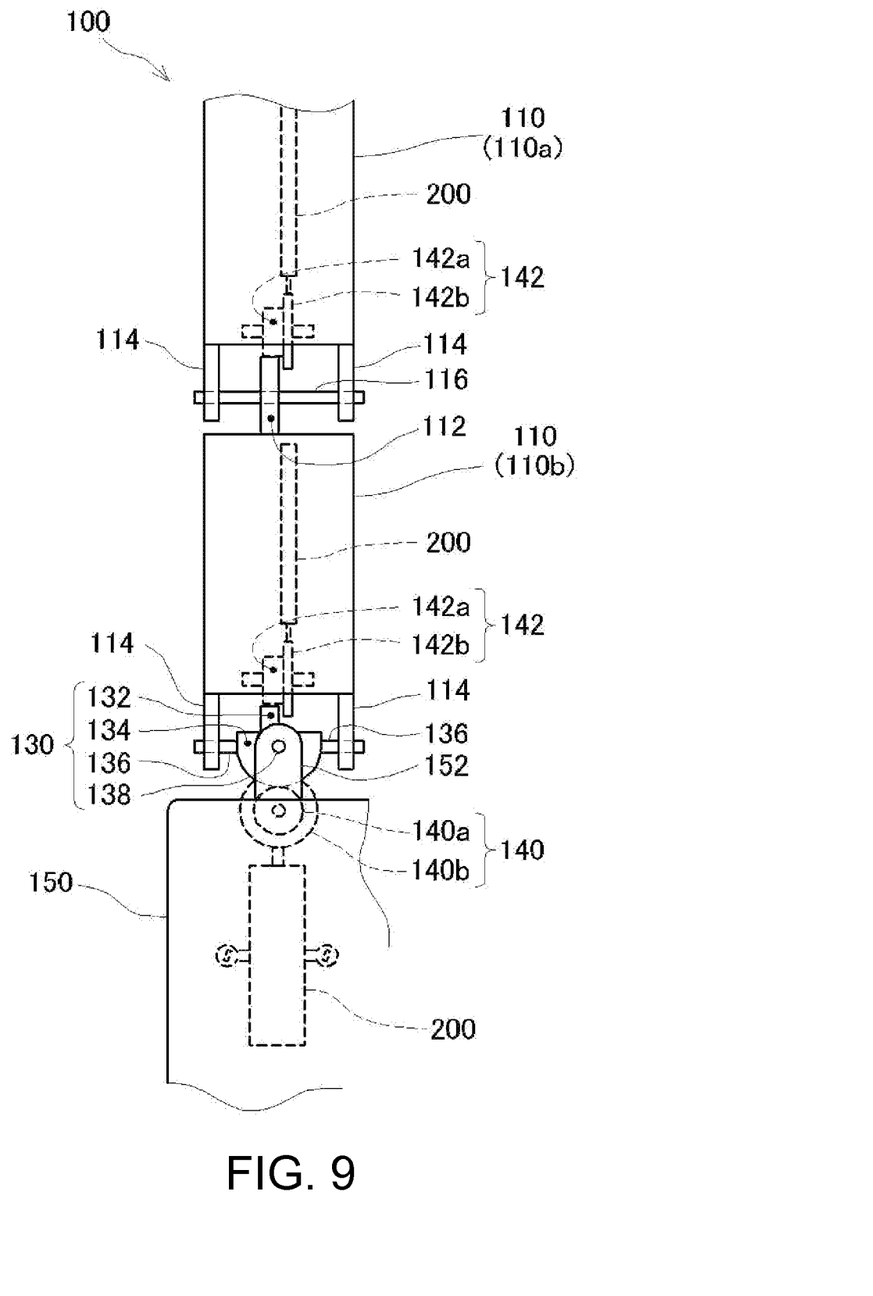
FIG. 9 is an explanatory diagram showing a structure of a finger part of a robot hand of a third modified example.

FIG. 9 is an explanatory diagram exemplifying a third modified example in which the piezoelectric motor 200 drives the first driven portion 132 and the second driven portion 134 via a reduction mechanism. In FIG. 9, regarding the finger part 100 of the third modified example, parts of the palm part 150, the connecting member 130, the base-side intermediate member 110b, and the end-side intermediate member 110a are enlarged. As illustrated, in the third modified example, a first reduction mechanism 140 is provided between the piezoelectric motor 200 housed in the palm part 150 and the second driven portion 134 of the connecting member 130. The first reduction mechanism 140 includes a small rotor 140a and a large rotor 140b having a larger diameter than that of the small rotor 140a coaxially assembled. When the piezoelectric motor 200 drives the large rotor 140b, the movement is decelerated via the small rotor 140a and transmitted to the second driven portion 134. Accordingly, the power of the piezoelectric motor 200 is increased and the base-side intermediate member 110b (and the end-side intermediate member 110a and the finger tip member 120) may be rotated around the first shaft 138 (bending direction).

Further, a second reduction mechanism 142 is provided between the piezoelectric motor 200 housed in the base-side intermediate member 110b and the first driven portion 132 of the connecting member 130. The second reduction mechanism 142 includes a small rotor 142a and a large rotor 142b having a larger diameter than that of the small rotor 142a coaxially assembled. When the piezoelectric motor 200 drives the large rotor 142b, the movement is decelerated via the small rotor 142a and transmitted to the first driven portion 132. Accordingly, the power of the piezoelectric motor 200 is increased and the base-side intermediate member 110b (and the end-side intermediate member 110a and the finger tip member 120) may be rotated around the second shaft 136 (lateral direction).

Figure 10A:
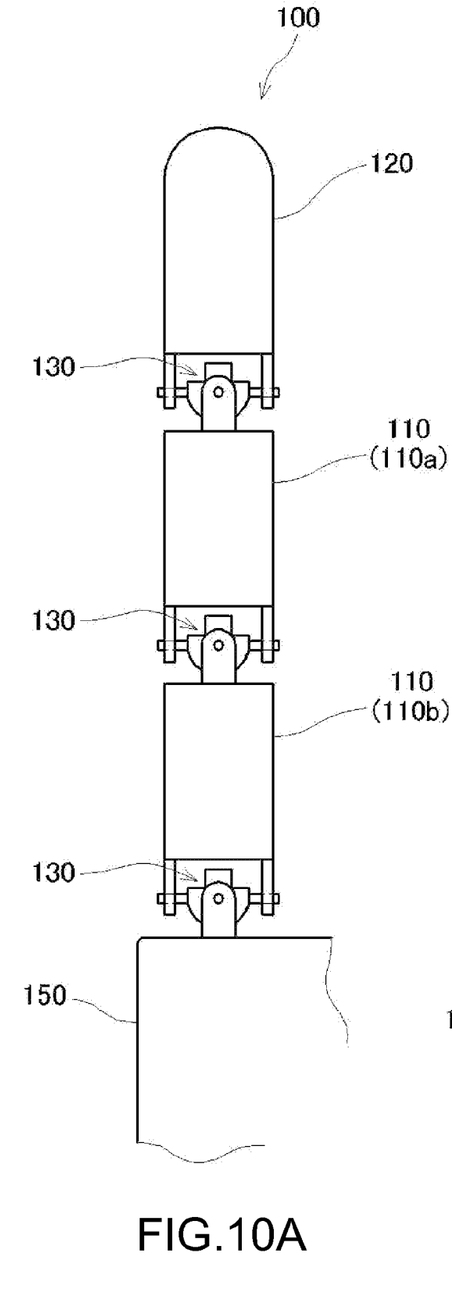
FIGS. 10A and 10B are explanatory diagrams showing a structure of a finger part of a robot hand of a fourth modified example.
Figure 10B:
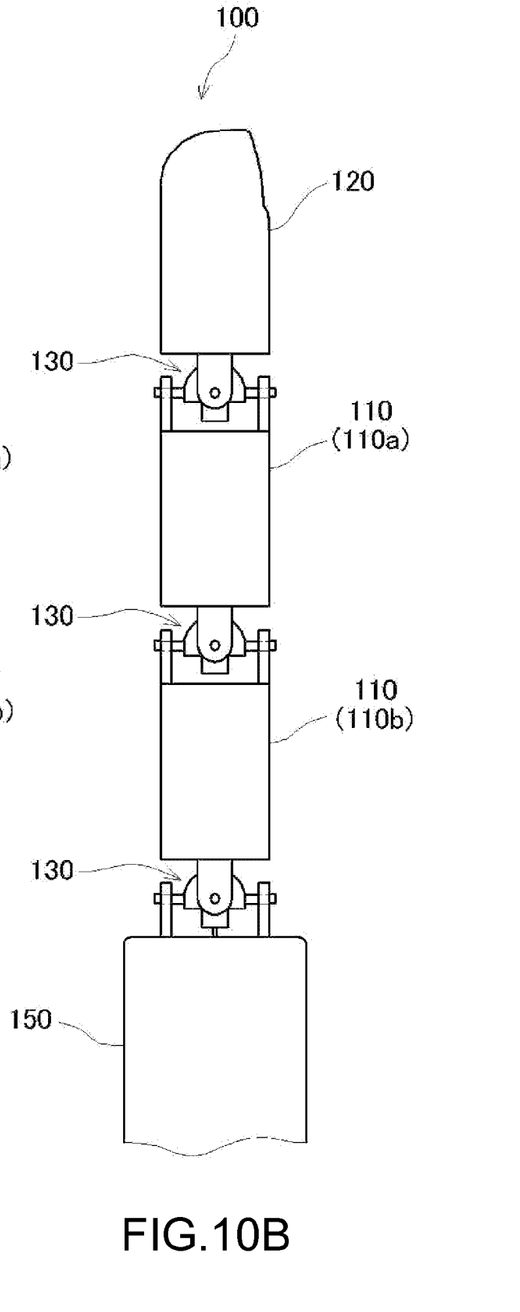

Furthermore, in the above described embodiment and the modified examples, the explanation that the connecting member 130 is not provided between the finger tip member 120 and the end-side intermediate member 110a or between the end-side intermediate member 110a and the base-side intermediate member 110b, and accordingly, rotation in the bending direction is possible, but rotation in the lateral direction is impossible in the parts has been made. However, like a fourth modified example exemplified in FIGS. 10A and 10B, the parts between the finger tip member 120 and the end-side intermediate member 110a and between the end-side intermediate member 110a and the base-side intermediate member 110b may be connected via the connecting members 130. In this manner, rotation in the bending direction and the lateral direction may be possible in the joint parts between the finger tip member 120 and the end-side intermediate member 110a and between the end-side intermediate member 110a and the base-side intermediate member 110b. In the above described third modified example, the base-side intermediate member 110b corresponds to "first member" in the invention and the end-side intermediate member 110a corresponds to "second member" in the invention.

Figure 11:
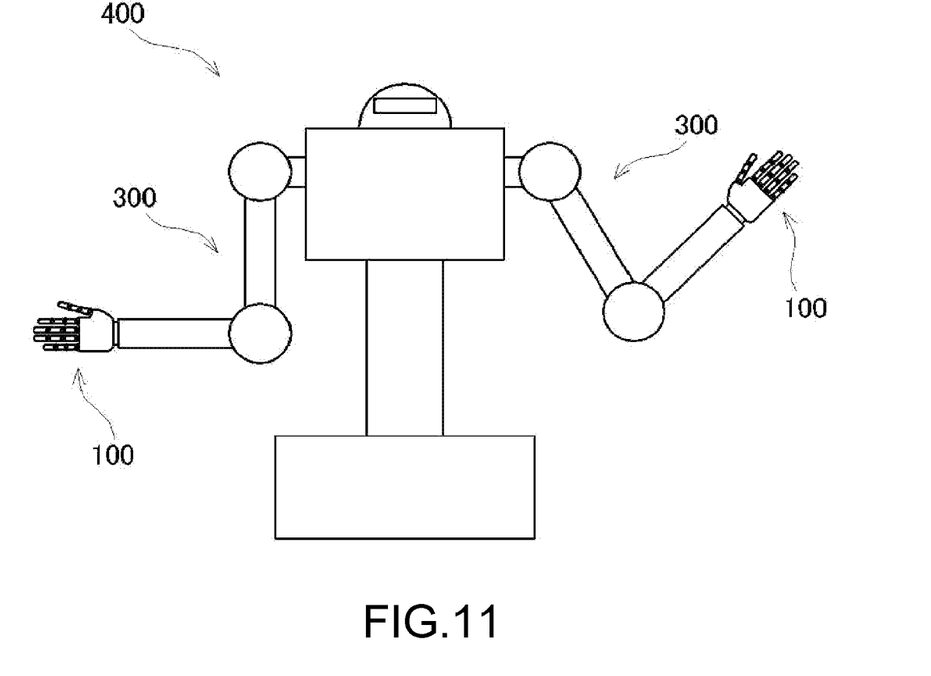
FIG. 11 is an explanatory diagram exemplifying a robot on which the robot hands of the embodiment or the modified example are mounted on distal ends of arms.

FIG. 11 is an explanatory diagram exemplifying a robot 400 on which the robot hands 10 of the embodiment or the modified example are mounted on distal ends of arms 300. As described above, the robot hands 10 of the embodiment or the modified example may be downsized while the robot hands 10 can flexibly move the finger parts 100a. Accordingly, the high-performance robot 400 may be realized.

The robot hands and the robots according to the invention have been explained, however, the invention is not limited to the above embodiment or the modified examples, but may be implemented in various forms without departing from the scope thereof.

The entire disclosure of Japanese Patent Application No. 2013-061545 filed Mar. 25, 2013 is expressly incorporated by reference herein.

What is claimed is:

1. A robot hand comprising:
a first member;
a second member having an elongated shape;
a connecting member attached to the first member so as to rotate around a first shaft intersecting a longitudinal direction of the second member and attached to the second member so as to rotate around a second shaft intersecting the longitudinal direction and a direction along the first shaft;
a first drive part provided in the first member and rotationally driving the connecting member around the first shaft; and
a second drive part provided in the second member and rotationally driving the connecting member around the second shaft,
wherein the first drive part and the second drive part are vibrators containing a piezoelectric material.

2. The robot hand according to claim 1, wherein the longitudinal direction of the second member, a longitudinal direction of the first shaft, and a longitudinal direction of the second shaft are orthogonal to one another.

3. The robot hand according to claim 1, wherein one of the first shaft and the second shaft is provided in a position offset from a centroid of a section set by a plane orthogonal to the longitudinal direction in the second member.

4. The robot hand according to claim 1, wherein the first member is a member having an elongated shape.

5. The robot hand according to claim 1, further comprising a first reduction mechanism that decelerates rotation from the first drive part.

6. The robot hand according to claim 1, further comprising a second reduction mechanism that decelerates rotation from the second drive part.

7. A robot comprising the robot hand according to claim 1.

8. A robot hand comprising:
a first member;
a second member having an elongated shape;
a connecting member that connects the first member and the second member;
the first shaft that connects the first member and the connecting member and intersects a longitudinal direction of the second member;
the second shaft that connects the second member and the connecting member and intersects both the longitudinal direction and the first shaft;
a first drive part provided in the first member and rotationally drives the connecting member around the first shaft; and
a second drive part provided in the second member and rotationally drives the connecting member around the second shaft,
wherein the first drive part and the second drive part are vibrators containing a piezoelectric material.

9. A robot comprising the robot hand according to claim 8.

10. A robot hand comprising:
a first member;
a second member having an elongated shape;
a connecting member that connects the first member and the second member;
a first vibrator provided in the first member and vibrating in a bending direction and a stretching direction;
a first shaft that connects the first member and the connecting member and intersects the stretching direction of the first vibrator;
a second shaft that connects the second member and the connecting member and intersects both the longitudinal direction and the stretching direction of the first vibrator; and
a second vibrator provided in the second member and vibrating in the bending direction and the stretching direction, the bending direction and the stretching direction intersecting the second shaft,
wherein the first vibrator rotationally drives the connecting member around the first shaft, and
the second vibrator rotationally drives the connecting member around the second shaft.

11. A robot comprising the robot hand according to claim 10.

* * * * *